United States Patent [19]
Teng

[11] 3,979,179
[45] Sept. 7, 1976

[54] PROCESS AND COMPOSITION FOR REDUCING EVAPORATION OF VOLATILE LIQUIDS

[75] Inventor: James Teng, St. Louis County, Mo.

[73] Assignee: Anheuser-Busch, Incorporated, St. Louis, Mo.

[22] Filed: Apr. 1, 1974

[21] Appl. No.: 457,081

[52] U.S. Cl. .............................. 21/60.5 A; 44/7 B; 47/58; 106/191; 252/316; 252/364; 424/350
[51] Int. Cl.² .......................................... B01J 1/18
[58] Field of Search ............... 252/316; 44/7 B; 21/60.5 R, 60.5 A; 106/191

[56] References Cited
UNITED STATES PATENTS

| | | | |
|---|---|---|---|
| 1,366,256 | 1/1921 | Groves | 106/191 |
| 3,036,899 | 5/1962 | Schnider | 252/316 X |
| 3,334,053 | 8/1967 | Audrieth et al. | 252/316 |
| 3,824,085 | 7/1974 | Teng et al. | 44/7 B |

Primary Examiner—Richard D. Lovering
Attorney, Agent, or Firm—Gravely, Lieder & Woodruff

[57] ABSTRACT

This application discloses a composition and method for gelling volatile liquids and the gelled volatile liquid. The composition comprises a cellulose ester coated with up to about 50% paraffin. When the paraffin coated particles of the cellulose ester are used to gel a volatile liquid, the gelled structure has a slower evaporation rate than the volatile liquid alone. The process of this invention includes the steps of adding melted paraffin to a cellulose ester, cooling, and stirring until free flowing granules are formed. When the granules are added to an organic solvent, the solvent gels and has a very slow rate of evaporation.

7 Claims, 1 Drawing Figure

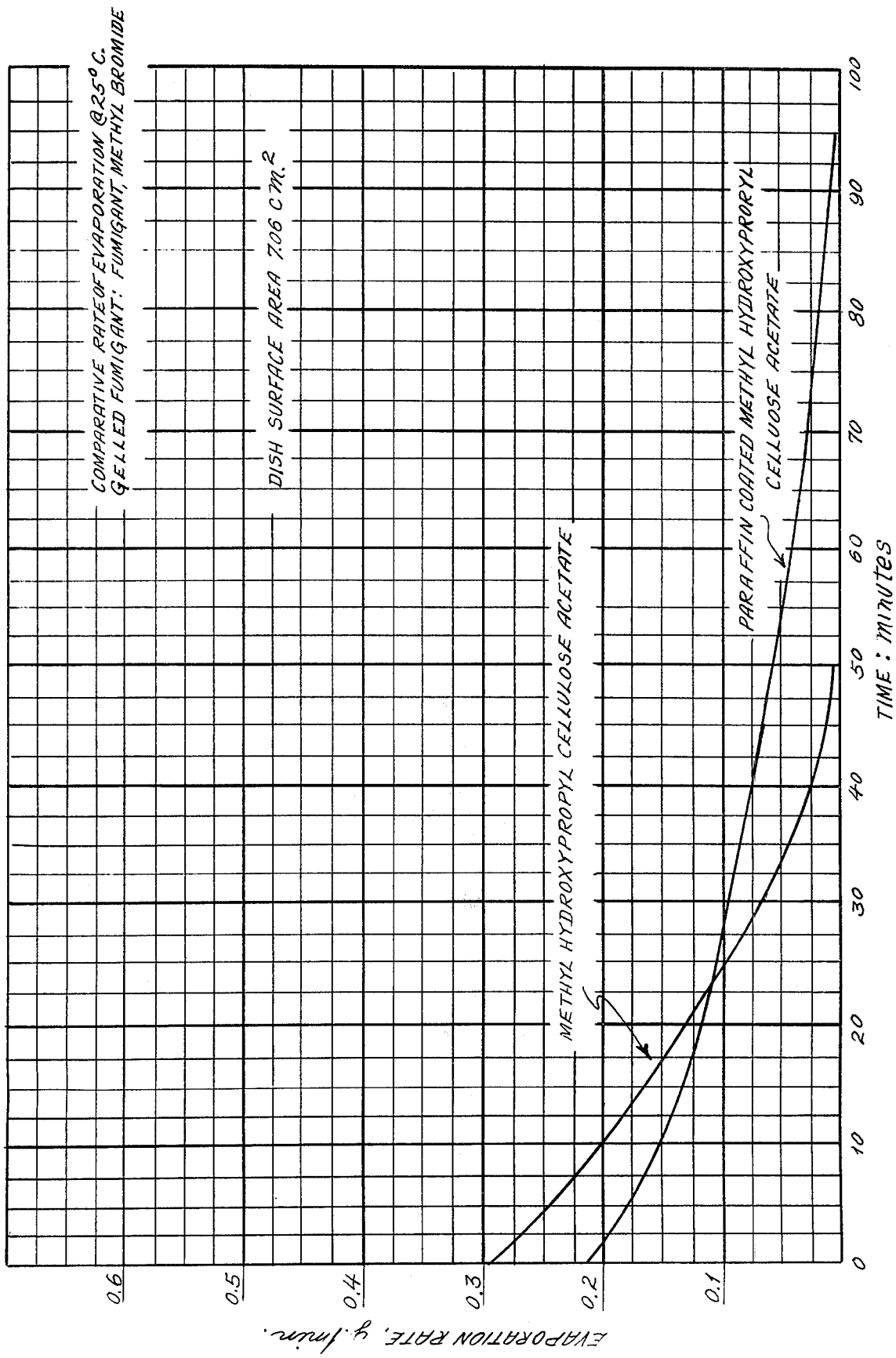

PROCESS AND COMPOSITION FOR REDUCING EVAPORATION OF VOLATILE LIQUIDS

BACKGROUND OF THE INVENTION

In pending applications Ser. Nos. 222,660, now U.S. Pat. No. 3,824,085, and 387,894, now U.S. Pat. No. 3,940,384, assigned to the assignee of the present invention, there are described cellulose esters and their uses as gelling agents for jet fuel, fumigants, and other hydrocarbons and non-polar solvents.

For special applications, it is desirable to not only gel organic solvents but also to reduce their volatility and evaporation rate. Many commercially important solvents, in particular, methyl bromide (which is widely used in soil fumigation) have improved effectiveness with controlled vaporization.

SUMMARY OF THE INVENTION

The present invention comprises a composition and process for gelling volatile liquids to reduce the evaporation rate and also comprises the gelled volatile liquid. The present invention further comprises a process of making said gelled volatile liquid by combining melted paraffin with a cellulose ester, cooling, stirring, and adding the mixture to the organic solvent to be gelled.

DETAILED DESCRIPTION

Application Ser. No. 222,660, filed Feb. 1, 1972, now U.S. Pat. No. 3,824,085, describes polymeric carbohydrate fatty acid esters as gelling agents for organic solvents. Specifically, hydroxypropyl cellulose acetate with a degree of molecular substitution (M.S.) of hydroxypropyl groups of about 2 to about 8 and a degree of substitution (D.S.) of acetate groups of about 1.2 to about 2.8 is shown as a gelling agent for a wide variety of non-polar organic solvents.

The disclosure of Ser. No. 222,660, now U.S. Pat. No. 3,824,085, is incorporated herein by reference and forms part of this disclosure.

Application Ser. No. 387,894 filed Aug. 13, 1973, now U.S. Pat. No. 3,940,384, describes another carbohydrate fatty acid ester as a gelling agent for organic solvents. Methyl hydroxypropyl cellulose acetate with a degree of molecular substitution of hydroxypropyl groups of about 2 to about 8, a degree of substitution of about 0.1 to about 1 methyl groups, and a degree of substitution of about 0.8 to about 2.5 acetyl groups is shown in application Ser. No. 387,894, now U.S. Pat. No. 3,940,384. The methyl hydroxypropyl cellulose acetate is a gelling agent for a variety of organic solvents, as is the hydroxypropyl cellulose acetate of application Ser. No. 222,660, now U.S. Pat. No. 3,824,085. The disclosure of Ser. No. 387,894, now U.S. Pat. No. 3,940,384, is incorporated herein by reference and forms part of this disclosure.

In certain instances, it is desirable to retard the evaporation of the solvent which has been gelled. This is particularly true where the solvent is spread over a large surface in a thin film, as in the fumigation of fields. When paraffin is added to the gelling agent in accordance with this invention, the subsequently gelled solvents have a lower rate of evaporation because of (1) slower diffusion rates and heat transfer rates in the gelled structure and (2) the formation of a resilient and continuous film over the surface to which the solvent is applied and consequently over the solvent itself.

As set forth in Ser. No. 222,660, now U.S. Pat. No. 3,824,085, the degree of molecular substitution (M.S.) determines the number of moles of

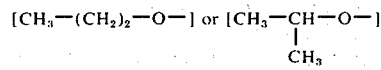

groups per anhydroglucose unit.

The M.S. of the cellulose esters used with this invention is from about 2 to about 8.

The esters of hydroxypropyl cellulose which can be used in this invention have a degree of substitution (D.S.) of about 0.8 to about 2.8 acetyl groups. The methods of making the cellulose esters of this invention are set forth in detail in application Ser. Nos. 222,660, now U.S. Pat. No. 3,824,085, and 387,894, now U.S. Pat. No. 3,940,384. The hydroxypropyl cellulose acetate produced in accordance with Ser. No. 222,660, when recovered as a dry product, has a particle size of 10 to 60 mesh (U.S. Standard Sieves). This is not critical and can be varied.

The amount of paraffin or other evaporation retarding materials is from about 10% to about 60% by weight of the gelling agent. The evaporation retarding materials useful with this invention include amorphous or crystalline paraffin.

The liquefied paraffin is added to the gelling agent with mixing until the two are intimately combined. The final product is in particulate form of 10 to 30 mesh, and, when viewed under a microscope, is composed of free flowing particles of polymer having a thin coating of paraffin around each such particle.

The amount of paraffin coated polymeric carbohydrate derivative used to gel a solvent is at least about 0.5 grams per 100 ml. of solvent and may be as much as about 4 grams per 100 ml. solvent. When either paraffin coated hydroxypropyl cellulose acetate or methyl hydroxypropyl cellulose acetate is used, the amount is about 0.7 to about 1.2 grams/100 ml. solvent to be gelled.

Examples of volatile fumigants which can be used in the process of the present invention are listed in the following Table I.

TABLE I

| Fumigant | Boiling Point, °C. |
| --- | --- |
| Acrylonitrile | 78 |
| Carbon disulfide | 46.3 |
| Carbon tetrachloride | 76 |
| Ethylene dichloride | 83.5 |
| Ethyl formate | 54 |
| Methyl bromide | 4.5 |
| Methyl formate | 32 |
| Trichloroacetonitrile | 85 |
| Trichloroethylene | 86.7 |

The foregoing volatile fumigants, when used in the process of this invention will exhibit a reduced rate of evaporation compared to the untreated fumigant. The formation of a uniform, continuous and resilient film or skin covering the entire surface of the gelled solvent reduces the volatility and induces a slower diffusion and heat transfer rate of the solvent in the gelled structure.

The following is the preferred embodiment of the invention:

EXAMPLE NO. 1

About 450 g. hydroxypropyl cellulose acetate of mesh 20 prepared according to the process described in application Ser. No. 222,660, now U.S. Pat. No. 3,824,085, is placed in a 4 liter stainless steel beaker and rapidly stirred at about 700 rpm by means of a drill press equipped with a U-shaped agitator. Paraffin having a melting point of 62°C. is heated to 70°C. and a thin stream is poured into the gelling agent. As the paraffin content of the mixture increases, the mixing becomes increasingly more difficult. When the movement becomes sluggish the addition of paraffin is stopped, and a cold bath is placed under the beaker to reduce the temperature of the mixture to about 45°C. The paraffin addition is resumed as the stirring becomes easy again. As much as 180 g. of paraffin may be used. Stirring is continued until the product appears as free flowing granules coated with paraffin.

EXAMPLE NO. 2

About 2 g. of the product of Example No. 1 is placed in 100 ml. of methyl bromide, a fumigant. This mixture is agitated at about 400 rpm for about 15 minutes. The temperature of the mixture during mixing is about 0°C.

After mixing, the paraffin coated polymeric carbohydrate derivative-organic solvent mixture is allowed to stand for about 20 minutes to complete gelation.

The final gel readily forms a skin or film which reduces the evaporation rate of the solvent.

Following are additional specific examples of my invention:

EXAMPLE NO. 3

This example is similar to the process of Example No. 1 but about 100 g. methyl hydroxypropyl cellulose acetate prepared according to the process described in application Ser. No. 387,894, now U.S. Pat. No. 3,940,384, is substituted for the hydroxypropyl cellulose acetate. Paraffin having a melting point of 62°C. is heated to 70°C. and poured into the gelling agent in the same manner as that shown in Example I. About 30 g. of paraffin is used.

Next, about 1.5 g. of the paraffin coated granules of methyl hydroxypropyl cellulose acetate are placed in 100 ml. of methyl bromide, a fumigant. This mixture is agitated at about 400 rpm for about 15 minutes resulting in a uniform gel. The temperature of the mixture during mixing is about 0°C.

The methyl bromide gel is placed into a dish. Gelled methyl bromide made with non-paraffin coated methyl hydroxypropyl cellulose acetate is placed in another dish. Samples were taken from each dish to compare their volatility. FIG. 1 illustrates the reduced volatility of the paraffin coated gelling agent. The surface area of each dish is approximately 7.06 cm² and the temperature is 25°C.

The results show that the formation of the skin or film on the surface of the gelled organic solvent greatly reduces the rate of evaporation of the solvent.

EXAMPLE NO. 4

About 1.5 grams of the paraffin coated hydroxypropyl cellulose acetate from Example No. 1 is placed in 100 ml. of ethylene dichloride.

The mixture is uniformly blended for 10 minutes at 25°C. The gel is then ready for use as a soil or grain fumigant. The film of this gel readily forms an elastic skin that retards vaporization.

This invention is intended to cover all changes and modifications of the example of the invention herein chosen for purposes of the disclosure which do not constitute departures from the spirit and scope of the invention.

What is claimed is:

1. The method of gelling volatile organic liquids wherein the rate of evaporation of the volatile organic liquid is reduced, comprising the steps of:
   A. agitating a cellulose ester having a degree of substitution from about 0.1 to about 2.8 and a degree of molar substitution of hydroxypropyl groups of about 2 to about 8,
   B. adding with agitation about 5 to about 35% by weight paraffin heated to a temperature above its melting point,
   C. cooling the mixture while continuing the agitation,
   D. agitating the mixture until free flowing granules are formed, said granules consisting of cellulose ester particles coated with the paraffin,
   E. adding about 0.5 to about 4 grams of the granules to each 100 ml. of volatile organic solvent to be gelled with agitation, and
   F. forming a continuous and resilient film over the entire surface of the gel.

2. The process of claim 1 wherein the cellulose ester is selected from a group consisting of hydroxypropyl cellulose acetate, and methyl hydroxypropyl cellulose acetate.

3. A composition for gelling a volatile liquid consisting essentially of free flowing granules of a hydroxypropyl cellulose ester coated with paraffin, which reduces the evaporation rate of the volatile liquid when added thereto.

4. The composition of claim 4 wherein the hydroxypropyl cellulose ester has a degree of substitution of about 1 to about 2 and a degree of molar substitution of about 2 to 8.

5. The composition of claim 4 wherein the cellulose ester is selected from the group consisting of hydroxypropyl cellulose acetate, and methyl hydroxypropyl cellulose acetate.

6. The method of producing a gelling agent that is capable of gelling organic solvents, comprising the steps of:
   A. agitating a cellulose ester having a degree of substitution from about 0.1 to about 2.8 and a degree of molar substitution of hydroxypropyl groups of about 2 to about 8,
   B. adding with agitation about 5 to about 35% by weight paraffin heated to a temperature above its melting point,
   C. cooling the mixture while continuing the agitation,
   D. agitating the mixture until free flowing granules are formed, said granules consisting of cellulose ester particles coated with the paraffin.

7. The method of claim 6 wherein the cellulose ester is selected from the group consisting of hydroxypropyl cellulose acetate, and methyl hydroxypropyl cellulose acetate.

* * * * *